United States Patent
Lee et al.

(10) Patent No.: US 8,855,631 B2
(45) Date of Patent: Oct. 7, 2014

(54) APPARATUS AND METHOD FOR MEASURING SIGNAL QUALITY IN A PORTABLE BROADCASTING NETWORK AND SYSTEM SUPPORTING THE SAME

(75) Inventors: Tae-Soo Lee, Seoul (KR); Young-Jip Kim, Suwon-si (KR); Jeong-Sik Cho, Suwon-si (KR); Jun-Young Choe, Suwon-si (KR); Kyung-Shin Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1023 days.

(21) Appl. No.: 12/366,404

(22) Filed: Feb. 5, 2009

(65) Prior Publication Data

US 2009/0197600 A1 Aug. 6, 2009

(30) Foreign Application Priority Data

Feb. 5, 2008 (KR) .................... 10-2008-0011983

(51) Int. Cl.
| | | |
|---|---|---|
| H04W 4/00 | (2009.01) | |
| H04W 24/00 | (2009.01) | |
| H04H 20/12 | (2008.01) | |
| H04H 60/85 | (2008.01) | |
| H04W 24/08 | (2009.01) | |
| H04H 60/72 | (2008.01) | |
| H04H 20/93 | (2008.01) | |
| H04H 60/51 | (2008.01) | |

(52) U.S. Cl.
CPC .............. H04H 20/12 (2013.01); H04H 60/85 (2013.01); H04W 24/08 (2013.01); H04H 60/72 (2013.01); H04H 20/93 (2013.01); H04H 60/51 (2013.01)
USPC ....................................... 455/434; 455/456.1

(58) Field of Classification Search
USPC .................... 455/434, 456.1, 456.2, 456.5
See application file for complete search history.

(56) References Cited

U.S. PATENT DOCUMENTS

| | | | | |
|---|---|---|---|---|
| 2003/0139181 | A1* | 7/2003 | Roy et al. ....................... | 455/427 |
| 2004/0044553 | A1* | 3/2004 | Lambert et al. .................... | 705/7 |
| 2005/0260990 | A1* | 11/2005 | Huang et al. ................... | 455/436 |
| 2006/0053450 | A1* | 3/2006 | Saarikivi et al. ................ | 725/46 |
| 2006/0293053 | A1* | 12/2006 | Zanaty .......................... | 455/436 |
| 2009/0005119 | A1* | 1/2009 | Patel et al. ................... | 455/562.1 |

* cited by examiner

Primary Examiner — Kent Chang
Assistant Examiner — Scott Au
(74) Attorney, Agent, or Firm — The Farrell Law Firm, P.C.

(57) ABSTRACT

An apparatus and method for measuring signal quality information in a mobile broadcasting network are provided, as well as a system supporting the same. A broadcast server provides a reporting condition for signal quality to a mobile terminal using a control message. The mobile terminal, when it satisfies the reporting condition, transmits a reporting message for signal quality to a management server managing signal qualities. The reporting message includes signal quality measurement results at the current location. In this way, information on the low-signal quality area is automatically collected from the mobile terminal, making it possible to rapidly and easily comprehend the sate of the mobile broadcasting network depending on the collected information.

22 Claims, 7 Drawing Sheets

```
<schema targetNamespace="urn:dvb:ipdc:esgbs:2005" xmlns:bs="urn:dvb:ipdc:esgbs:2005"
        xmlns:mpeg7="urn:mpeg:mpeg7:schema:2001" xmlns="http://www.w3.org/2001/
        XMLSchema" elementFormDefault="qualified" attributeFormDefault="unqualified">
    <import namespace="urn:mpeg:mpeg7:schema:2001" />

<complexType name="ESGProviderType">
        <sequence>
            <element name="ProviderURI" type="anyURI"/>
            <element name="ProviderName" type="mpeg7:TextualType"/>
            <element name="ProviderLogo" type="mpeg7:TitleMediaType" minOccurs="0"/>
            <element name="ProviderID" type="positiveInteger"/>
            <element name="ProviderInformationURL" type="anyURI" minOccurs="0"/>
            <element name="PrivateAuxiliaryData" type="anyType" minOccurs="0"/>  ~310
        </sequence>
    </complexType>

<element name="ESGProviderDiscovery">
    <complexType>
        <sequence>
            <element name="ServiceProvider" type="bs:ESGProviderType" maxOccurs="unbounded"/>
        </sequence>
    </complexType>
    </element>
</schema>
```

FIG.3A

```
<complexType name="ServerSNRReporting">
    <Sequence>
        <element name="HostURI" type="anyURI"/>
        <element name="ReportingPeriod" type="positiveInteger"/>
        <element name="SNRThreshold" type="Integer"/>
    </Sequence>
</complexType>
```

FIG.3B

```
<?xml version="1.0" encoding="UTF-8"?>
<ESGProviderDiscovery xmlns="urn:dvb:ipdc:esgbs:2005">
    <ServiceProvider>
        <ProviderURI>expway.com</ProviderURI>
        <ProviderName>Expway</ProviderName>
        <ProviderID>33399</ProviderID>
        <ProviderInformationURL>http://www.expway.com/FastESG/NE/R2.2.3.45.2</ProviderInformationURL>
        <PrivateAuxiliaryData>
            <ServerSNRReporting>
                <HostURI>http://snr.dvb.co.kr/do.cgi</HostURI>
                <ReportingPeriod>100</ReportingPeriod>
                <SNRThreshold>20</SNRThreshold>
            </Info>
        </PrivateAuxiliaryData>
    </ServiceProvider>
</ESGProviderDiscovery>
```

```
<complexType name="SNRReportingData">
    <Sequence>
        <element name="currTime" type="dateTime"/>
        <element name="TerminalName" type="mpeg7:TextualType" minOccurs="0"/>
        <element name="IMEI" type="mpeg7:TextualType" minOccurs="0"/>
        <element name="SNR" type="Integer"/>
        <element name="LocationInfo" type="anyType"/>
    </Sequence>
</complexType>
```

FIG.6

| AREA | Signal Quality (SNR) | reporting time | Terminal Name | IMEI |
|---|---|---|---|---|
| A | 10db | 2007-10-1 11:00 | SGH-P930 | 000000000000000 |
| B | 20db | 2007-10-2 09:00 | SGH-P930 | 000000000001001 |
| C | 5db | 2007-10-2 17:13 | SGH-P940 | 000000000000203 |
| D | 3db | 2007-10-4 22:00 | SGH-P940 | 000000000200400 |
| E | 25db | 2007-10-3 10:30 | SGH-P930 | 000000000030040 |

FIG.7

APPARATUS AND METHOD FOR MEASURING SIGNAL QUALITY IN A PORTABLE BROADCASTING NETWORK AND SYSTEM SUPPORTING THE SAME

PRIORITY

This application claims priority under 35 U.S.C. §119(a) to a Korean Patent Application filed in the Korean Intellectual Property Office on Feb. 5, 2008 and assigned Serial No. 2008-11983, the disclosure of which is incorporated herein by reference.

BACKGROUND OF THE INVENTION

1. Field of the Invention

The present invention relates generally to mobile broadcasting technology, and more particularly, to an apparatus and method for measuring signal quality information in a mobile broadcasting network, and a system supporting the same.

2. Description of the Related Art

Two of the most important functions in mobile terminals at this time include mobile broadcasting and wireless internet. In the field of mobile broadcasting, terrestrial Digital Multimedia Broadcasting (DMB), satellite DMB, European Digital Video Broadcasting-Handhelds (DVB-H), and American Media Forward Link Only (MediaFLO) are competing with each other for a greater share of the market. While in the field of wireless internet, Wireless Broadband (WiBro) and World Interoperability for Microwave Access (WiMAX) are expected to gain popularity.

Mobile terminals, with which users can view mobile broadcasts, are becoming increasingly popular. However, even though users have such terminals, they are not able to view broadcasts everywhere. A mobile terminal supporting mobile broadcasting, such as terrestrial DMB, satellite DMB, DVB-H and MediaFLO, receives signals from a mobile broadcasting server and a repeater in order to perform broadcasting reception and reproduction. However, in some cases, mobile broadcast viewing may become impossible as the user moves into a shadow area, or as reception sensitivity decreases due to surrounding signal interference.

In order to prevent such problems, a broadcasting provider prepares for the elimination of low-reception strength areas or shadow areas of the mobile broadcasting network by searching for the low-reception strength areas or shadow areas of the mobile broadcasting network, and installing additional repeaters in the shadow areas.

In order to search for such low-reception strength areas or shadow areas of the mobile broadcasting network, a searcher carries test equipment around several areas to check a Signal to Noise Ratio (SNR) value indicating signal quality. In this manner, the mobile broadcasting provider can determine in which area the signal quality is reduced, and is able to take measures to improve signal quality in the area.

The conventional method of detecting signal quality of the mobile broadcasting network is a passive method in which the searcher directly tests signal quality in the corresponding area. Though this passive method is able to check signal quality in each area, it is unable to simultaneously check signal quality in all areas. In addition, when many searchers are mobilized to check signal quality in several areas, considerable time and expenses are wasted, and accurate measurements are not guaranteed. Further, since the conventional passive method has no way of simultaneously collecting measurement results in several areas, the mobile broadcasting provider has difficulty in comprehensively managing the measurement results.

SUMMARY OF THE INVENTION

The present invention has been made to address at least the above problems and/or disadvantages and to provide at least the advantages described below. Accordingly, an aspect of the present invention provides an apparatus and method for efficiently measuring signal quality information in a mobile broadcasting network, and a system supporting the same.

Another aspect of the present invention provides an apparatus and method for easily providing signal quality information of each area, and a system supporting the same.

According to one aspect of the present invention, a system is provided for measuring signal quality in a mobile broadcasting network. The system includes a broadcast server for generating a control message including a reporting condition for signal quality, and broadcasting the control message within the mobile broadcasting network. The system also includes at least one mobile broadcasting terminal for, upon receipt of the control message, measuring signal quality at a current location in accordance with the reporting condition of the received control message, and transmitting a reporting message composed of the measured signal quality and area information corresponding to the current location. The system further includes a management server for collecting signal quality measurements of each area based on the reporting message transmitted from the at least one mobile broadcasting terminal, and managing the collected signal quality of each area.

According to another aspect of the present invention, a method is provided for measuring signal quality in a mobile broadcasting terminal of a mobile broadcasting system. A control message broadcasted from a broadcast server is received. Signal quality at the current location is measured in accordance with a reporting condition of the received control message. A reporting message is generated using the measured signal quality and area information corresponding to the current location. The generated reporting message is transmitted.

According to a further aspect of the present invention, an apparatus is provided for measuring signal quality in a mobile broadcasting terminal of a mobile broadcasting system. The apparatus includes a receiver for receiving a control message broadcasted from a broadcast server. The apparatus also includes a reporting manager for measuring signal quality at the current location in accordance with a reporting condition of the received control message, and generating a reporting message using the measured signal quality and the current location information. The apparatus further includes a transmitter for transmitting the generated reporting message.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention are described in detail with reference to the accompanying drawings. In the drawings, the same or similar elements are denoted by the same reference numerals even though they are depicted in different drawings. In the following description, detailed descriptions of constructions or processes known in the art may be omitted to avoid obscuring the subject matter of the present invention.

The present invention provides an apparatus and method for measuring signal quality information in a mobile broadcasting network, and a system supporting the same. In embodiments of the present invention, a broadcast server provides a reporting condition for signal quality to a mobile terminal using a control message, and the mobile terminal transmits a reporting message for signal quality to a server (management server) managing signal qualities, if it satisfies the reporting condition. The reporting message includes the signal quality measurement results at the current location. Since information on low-signal quality areas is automatically collected from the mobile terminal in this way, it is possible to rapidly and easily detect the status of the mobile broadcasting network depending on the collected information.

Figure 1:
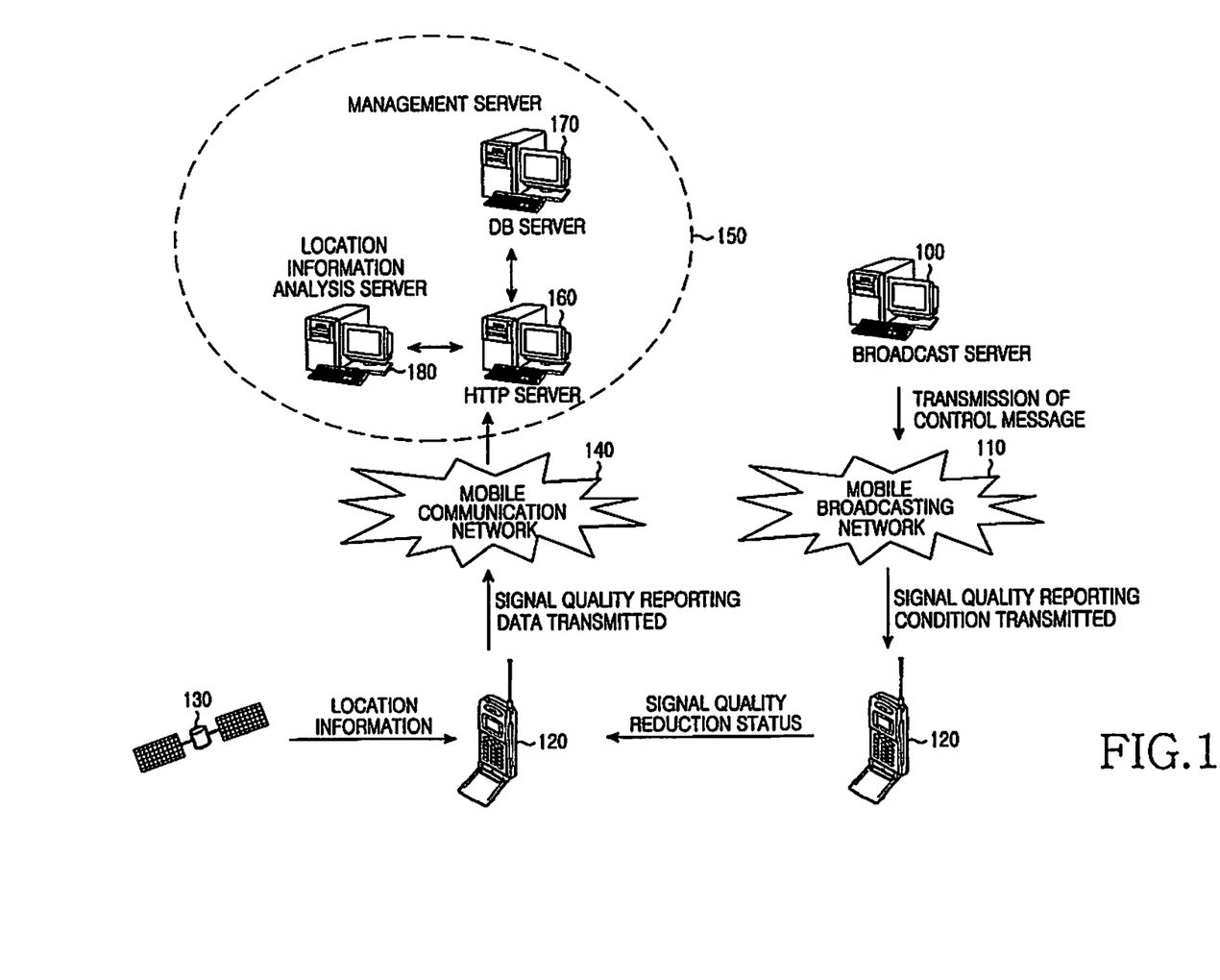
FIG. 1 is a diagram illustrating a system configuration according to an embodiment of the present invention.

With reference to FIG. 1, a description will now be made of a system configuration for collecting information on low-reception strength areas in a mobile broadcasting network according to an embodiment of the present invention. An example of mobile broadcasting in the embodiment of the present invention is European Digital Video Broadcasting-Handhelds (DVB-H). The application of other various mobile broadcasting technologies, such as terrestrial Digital Multimedia Broadcasting (DMB), satellite DMB, and American Media Forward Link Only (MediaFLO), is also possible.

Referring to FIG. 1, a system for collecting signal quality information in a mobile broadcasting network includes a broadcast server 100, a mobile terminal 120, and a management server 150. The management server 150 includes a Hypertext Transfer Protocol (HTTP) server 160, a Database (DB) server 170, and a location information analysis server 180. Although only one mobile terminal 120 is illustrated in FIG. 1 for a description of an operation in the terminal, an embodiment of the present invention is premised on the assumption that reporting data for signal quality is collected in one or more terminals. In order to determine how many terminals have signal quality less than or equal to a threshold in certain areas, it is preferable to collect reporting data from one or more mobile terminals.

The broadcast server 100 provides reporting condition for signal quality to the mobile terminal 120 via a mobile broadcasting network 110. The broadcast server 100 generates a control message including a reporting condition for signal quality, and broadcasts it within the mobile broadcasting network 110. The control message can include, for example, an Electronic Service Guide (ESG) message. Other messages provided by other broadcast servers can also be used. In this case, the reporting condition is inserted into the ESG message and delivered to the mobile terminal 120. In the following description, the control message is assumed to be an ESG message.

The mobile terminal 120 extracts the reporting condition from the ESG message, and stores the extracted reporting condition therein. The mobile terminal 120 measures signal quality only when a reporting condition is included in the ESG message. The mobile terminal 120 measures signal quality at the current location referring to the reporting condition, and then transmits a reporting message composed of the measurement results and area information corresponding to the current location. Specifically, when a measurement time period is defined in the reporting condition, the mobile terminal 120 reports signal quality at the time period defined in the reporting condition. The mobile terminal 120 measures signal quality every time the defined time period comes. A Signal to Noise Ratio (SNR) value indicating received signal strength can be used for measuring the signal quality. The measurement of signal quality is made to determine whether signal quality is reduced in the area where the mobile terminal 120 is currently located.

The mobile terminal 120 also determines whether the signal quality measured at the current location is less than or equal to a threshold. The threshold is provided for determining a level of the measured signal quality. This threshold can be provided from the broadcast server 100 after being defined in the reporting condition, or it can be previously stored in the mobile terminal 120 before the mobile terminal 120 is put on the market. Accordingly, a reporting message for signal quality can be generated when the measured signal quality is less than or equal to a predetermined threshold or a threshold in the reporting condition.

If the measured signal quality is less than or equal to the threshold, the mobile terminal 120 generates a signal quality reporting message composed of area information corresponding to the current location information, including the signal quality measurement results. The current location information can be acquired with various methods such as, for example, a Global Positioning System (GPS) satellite 130. The mobile terminal 120 includes area information in the reporting message that corresponds to the current location information along with the measurement results. Instead, the mobile terminal 120 may only include the current location information together with the measurement results. Subsequently, the mobile terminal 120 reports the generated signal quality reporting message to the management server 150 via a mobile communication network 140.

The management server 150 collects signal quality measurements of each area based on the reporting message transmitted from one or more mobile broadcasting terminals, and manages the collected signal quality measurements of each area. In the configuration illustrated in FIG. 1, the management server 150 includes the HTTP server 160, the DB server 170 and the location information analysis server 180. However, the servers 160, 170 and 180 can also be realized in an integrated management server 150.

Operations in the servers 160, 170 and 180 included in the management server 150 are described below. In an embodiment of the present invention, it is assumed that an HTTP POST protocol is used to transmit a reporting message for signal quality to the management server 150. Accordingly, the mobile terminal 120 delivers its reporting message to the HTTP server 160 via the mobile communication network 140 that uses the HTTP POST protocol. When location information is included in the reporting message, the HTTP server 160 delivers the location information included in the reporting message to the location information analysis server 180 in order to acquire area information such as detailed area names. In response, the HTTP server 160 can acquire data of the desired type, for example, area information corresponding to the location information, from the location information analysis server 180. After acquiring the area information, the HTTP server 160 stores it in the DB server 170. The mobile terminal 120 can also directly transmit area information corresponding to the current location to the management server 150 along with the measured signal quality. In this case, the separate use of the location information analysis server 180 may not be needed. As a result, data for the areas where signal quality of each mobile terminal is less than or equal to a threshold, is accumulated in the DB server 170.

Figure 2:
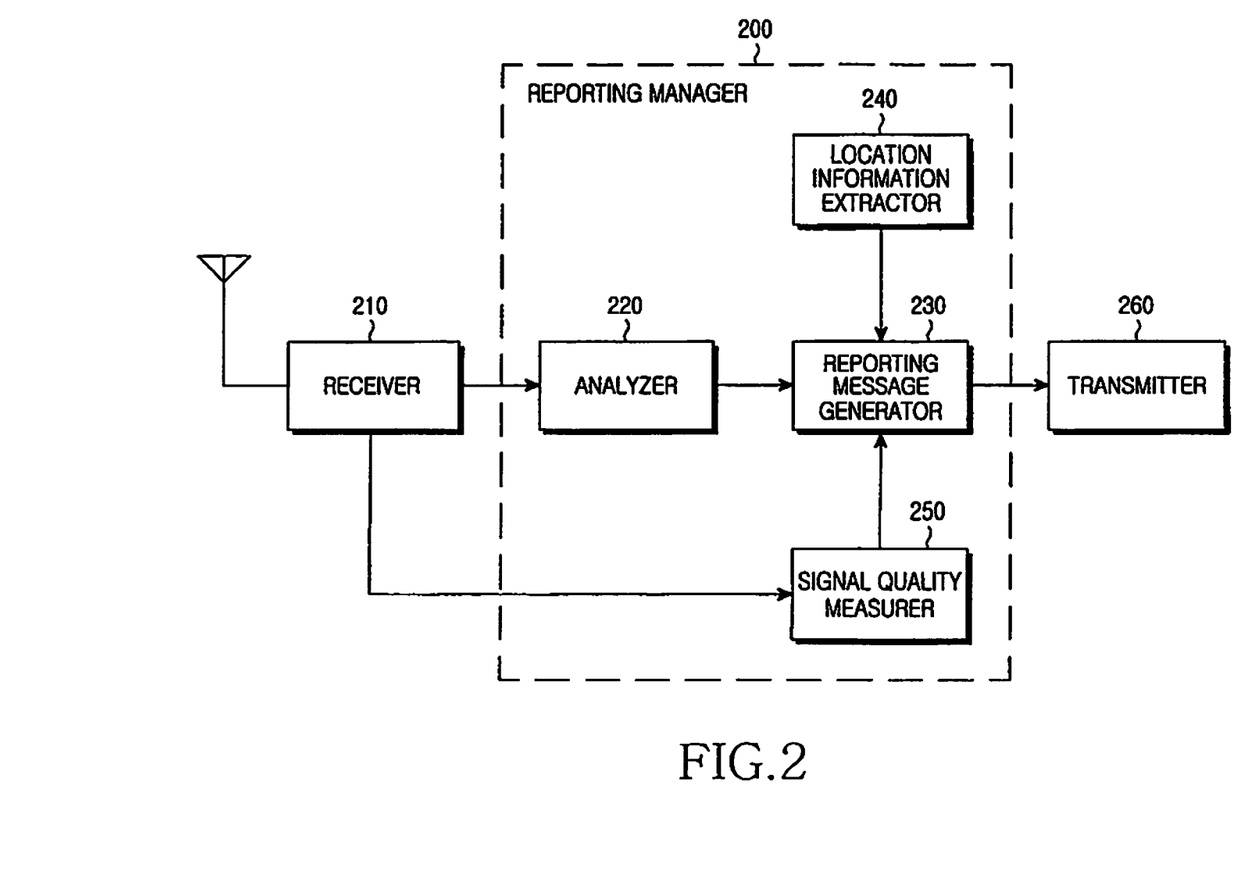
FIG. 2 is a diagram illustrating an internal structure of a mobile broadcasting terminal according to an embodiment of the present invention.

Reference will now be made to FIG. 2 to give a detailed description of operations in the mobile terminal 120. Referring to FIG. 2, the mobile terminal 120 includes a reporting manager 200, a receiver 210 and a transmitter 260.

The receiver 210 receives a control message broadcasted from the broadcast server 100. This receiver 210 receives an ESG message which is transmitted using an 'Asynchronous Layered Coding (ALC)/File Delivery over Unidirectional Transport (FLUTE) protocol. The receiver 210 can serve as a constituent element for receiving and processing mobile broadcasting signals from the broadcast server 100, and an embodiment of the present invention, the receiver 210 corresponds to a mobile chip and its associated device driver.

The reporting manager 200 measures signal quality at a current location that corresponds to a reporting condition included in the received control message, and generates a reporting message using the measured signal quality and area information corresponding to the current location. The reporting manager 200 includes an analyzer 220, a reporting message generator 230, a location information extractor 240 and a signal quality measurer 250.

The analyzer 220 serves to analyze the reporting condition included in the received control message. Accordingly, when the control message is an ESG message, the analyzer 220 analyzes the ESG message according to an ESG schema, and stores the analysis results to be suitable for the internal data structure. The analyzer 220 determines whether a reporting condition for signal quality is included in the ESG message. If the reporting condition is included, the analyzer 220 additionally extracts and stores the reporting condition.

The reporting message generator 230, which is provided with the reporting condition analyzed by the analyzer 220, generates a reporting message using the signal quality measured based on the reporting condition, and the current location information. More specifically, the reporting message generator 230 generates a reporting message for signal quality when it satisfies the reporting condition. In order to generate the reporting message, the reporting message generator 230 receives the signal quality measurement results from the signal quality measurer 250, and receives current location information or area information corresponding to the current location information from the location information extractor 240. The reporting message, based on the data structure proposed by the present invention, is made using the received current location information or area information corresponding to the current location information along with the received signal quality measurement results.

The location information extractor 240, which provides the current location information, is a constituent element for detecting the current location of the mobile terminal 120. The location information extractor 240 can be realized to provide not only the location information but also the area information corresponding to the location information. The detection of the current location is made for transmission of the location together with the signal quality measurement results to the management server 150.

The signal quality measurer 250 measures quality of a signal received from the receiver 210. Specifically, the signal quality measurer 250 measures the strength of a signal received through a frequency for the current broadcast service in order to provide the broadcast service selected by the user in the optimal state. The signal quality measurer 250 repeatedly measures received signal strength to determine a change in the received signal strength, and in an embodiment of the present invention, the signal quality measurer 250 performs repeated measurement at the time period defined in the reporting condition.

The transmitter 260 serves to transmit the reporting message made by the reporting message generator 230 to the management server 150. The transmitter 260 uses an HTTP protocol to transmit the reporting message over the mobile communication network 140.

As described above, according to an embodiment of the present invention, the mobile terminal 120 extracts a reporting condition for signal quality from the control message, and manages it separately. A description will now be made regarding how a reporting condition is carried on an ESG message based on the delivery architecture of the ESG message, according to an embodiment of the present invention.

When a user activates a TV application to enjoy a mobile service, an ESG download process is started. By receiving an ESG stream, the mobile terminal 120 acquires the essential information necessary for receiving the service provided by the service provider. When the user selects a particular service, the mobile terminal 120 accesses the data stream on which the service is transmitted, using the acquired information, and then actually receives ESG data. The information by which the mobile terminal 120 accesses the service data stream is transmitted through an ESG Fragment.

For reception of the ESG data, the mobile terminal 120 receives an ESG Bootstrap session based on channel information of the ESG Bootstrap session. The ESG Bootstrap session is composed of an ESG Provider Descriptor and an ESG Access Descriptor. Relevant information such as ID, name and logo of the ESG provider, is transmitted in the ESG Provider Descriptor. Information of ESG Announcement Carousel, and information on the number of and addresses of IP sessions where ESG data is transmitted, are transmitted in the ESG Access Descriptor. In this way, the mobile terminal 120 can obtain available ESG provider information using information of the ESG Provider Descriptor, and can provide the broadcast service to the user through an ESG Building process.

Figure 3A:
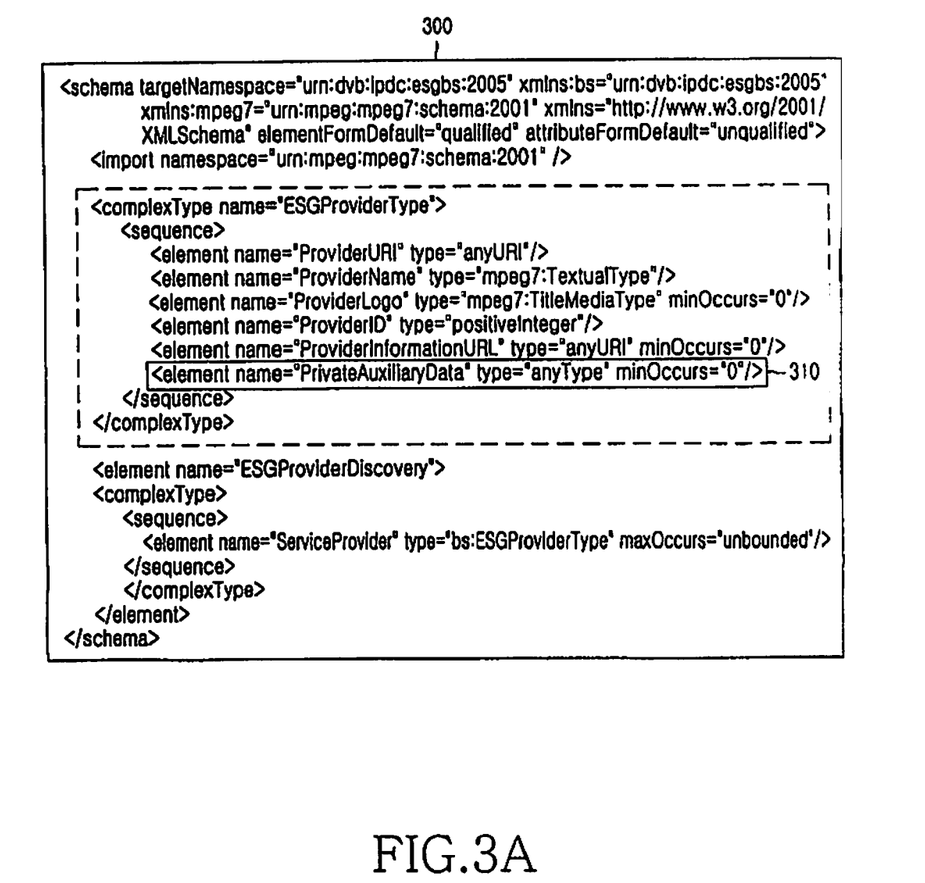
FIGS. 3A-3C are diagrams illustrating an example of an ESG schema where a reporting condition is inserted according to an embodiment of the present invention.

FIG. 3A illustrates a schema of an ESG Provider Descriptor. The mobile terminal 120 can obtain available ESG provider information using information of an ESG Provider Descriptor 300. In an embodiment of the present invention, the ESG Provider Descriptor 300 transmits a reporting condition using an element "PrivateAuxiliaryData".

Figure 3B:
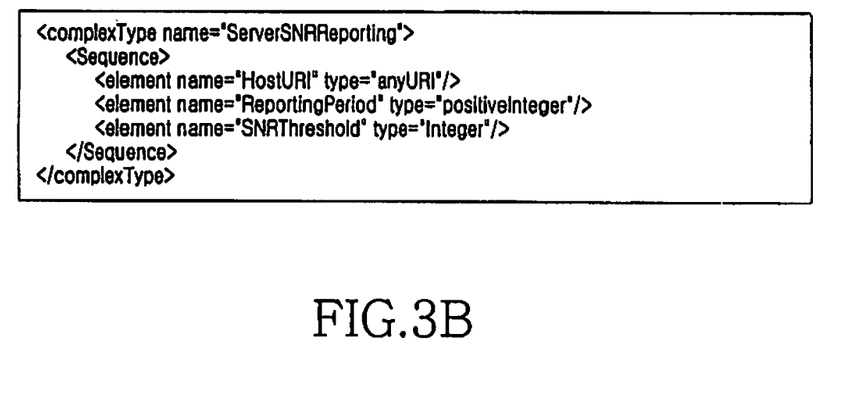

FIG. 3B illustrates a schema of a reporting condition proposed by the present invention. Although a threshold of signal quality and/or a time period for which the signal quality is measured are defined as the reporting condition, and only the most basic conditions are shown in an embodiment of the present invention, the number of reportings (1 reporting or more than 1 reporting), a reporting time period (reporting every 1 hour), and other various conditions can be included.

The reporting condition will be described in detail with reference to the structure defined in FIG. 3B. The schema of the reporting condition includes therein elements "HostURI", "ReportingPeriod" and "SNRThreshold". In "HostURI" an address of a management server to which a reporting message will be delivered is set, and it indicates a URI of, for example, the HTTP server 160. In "ReportingPeriod" a time period for which signal quality is measured is set. The time period set in "ReportingPeriod" is a second in its unit. The time period is used for allowing the mobile terminal 120 to perform a signal quality measurement operation at the set time period unless the time period is '0'. In "SNRThreshold" a threshold of signal quality is set. The threshold of signal quality is used for allowing the mobile terminal 120 to report the signal quality measurement results when the signal quality is less than or equal to the threshold.

Figure 3C:
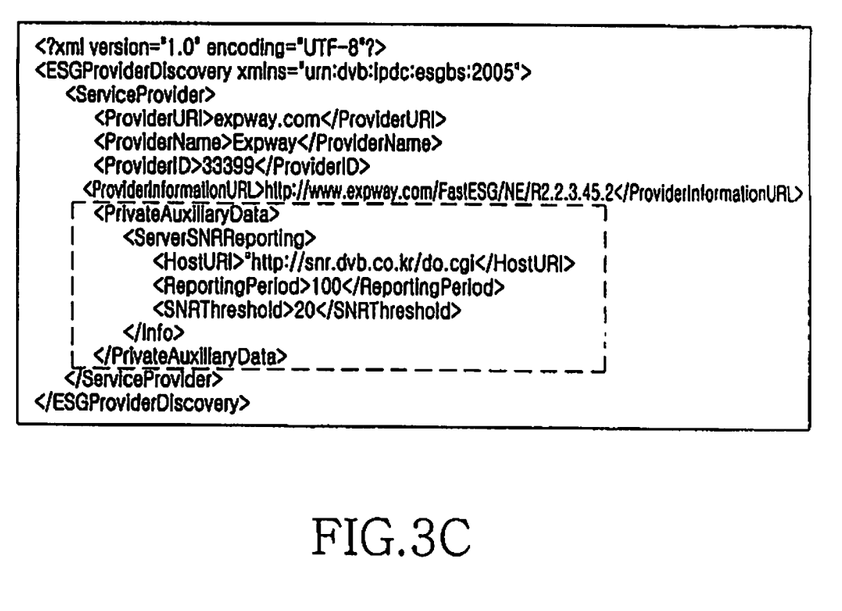

Shown in FIG. 3C is an example where the reporting condition having the schema of FIG. 3B is inserted into the ESG Provider Descriptor 300 of FIG. 3A. In order to transmit the reporting condition in an ESG message, a type for reporting condition should be additionally defined in the ESG Provider Descriptor. An embodiment of the present invention uses a type "PrivateAuxiliaryData". Shown in FIG. 3C is an example where the reporting condition having the schema of FIG. 3B is inserted into an element "PrivateAuxiliaryData" in the schema of FIG. 3A. In the example of FIG. 3C where the reporting condition is inserted into the ESG Provider Descriptor, the mobile terminal 120 can determine if the reporting condition is included, by checking the type "PrivateAuxiliaryData". Based on the type "PrivateAuxiliaryData" previously defined to identify the reporting condition, the mobile terminal 120 can find the reporting condition necessary for measuring signal quality.

Figure 4:
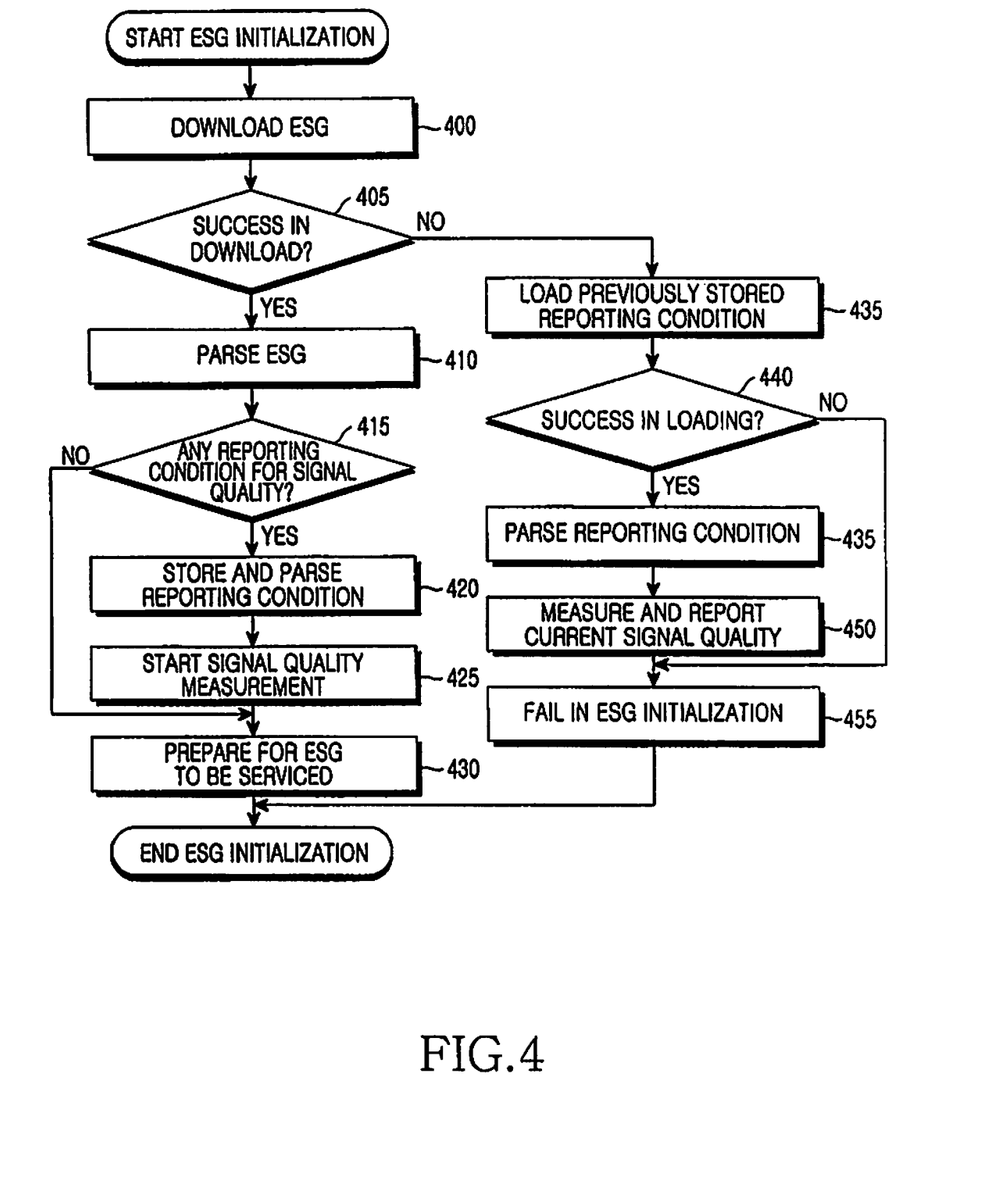
FIG. 4 is a flow diagram illustrating a process of acquiring a reporting condition from an ESG message by a mobile broadcasting terminal according to an embodiment of the present invention.

With reference to FIG. 4, a description is provided of a process of acquiring a reporting condition from an ESG message by a mobile terminal. More specifically, referring to FIG. 4, a description is provided of an operation in which the mobile terminal 120 receives an ESG message. When ESG initialization is started, the mobile terminal 120 starts ESG download in step 400. The mobile terminal 120 determines in step 405 whether it has succeeded in the download, and if the mobile terminal 120 has succeeded in the download, it parses the ESG message in step 410.

The mobile terminal 120 determines in step 415 whether a reporting condition for signal quality is included in an ESG message. Specifically, the mobile terminal 120 checks whether a type "PrivateAuxiliaryData" is defined in an ESG Provider Descriptor, and if the type "PrivateAuxiliaryData" is defined, the mobile terminal 120 determines that a reporting condition is inserted. Thus, based on the type "PrivateAuxiliaryData", the mobile terminal 120 finds an element "ServerSNRReporting" in the ESG Provider Descriptor and extracts a reporting condition from the element "ServerSNRReporting". Accordingly, the mobile terminal 120 stores and parses the extracted reporting condition in step 420.

The mobile terminal 120 begins signal quality measurement according to the reporting condition in step 425, and prepares for an ESG to be serviced, in step 430. In other words, the mobile terminal 120 delivers the extracted reporting condition to the reporting manager 200, and activates a user interface application to output a screen on which the user can view information on the broadcast service. A detailed description of a measurement process for signal quality is provided in greater detail with reference to FIG. 5. If it is determined in step 415 that no reporting condition is included, the mobile terminal 120 directly proceeds to step 430 where it prepares for an ESG to be serviced.

If it is determined in step 405 that the mobile terminal 120 has failed in the download, the mobile terminal 120 loads a previously stored reporting condition in step 435. The previously stored reporting condition is a reporting condition that was stored previously when the user viewed the broadcast service. Thereafter, the mobile terminal 120 determines in step 440 whether it has succeeded in the loading, and if the mobile terminal 120 has succeeded in the loading, it parses the reporting condition in step 435. Thereafter, the mobile terminal 120 measures and reports the current signal quality based on the parsed reporting condition in step 450. Here, if the current signal quality is less than or equal to a threshold set in the reporting condition, the current location information can be reported together with the measurement results.

Even though the mobile terminal 120 reports the reporting data for signal quality to the management server 150 using the previously stored reporting condition in this manner, since the mobile terminal 120 has not succeeded in the ESG download, it fails in ESG initialization in step 455. If it is determined in step 440 that the mobile terminal 120 has not succeeded in the loading, for example, there is no previously stored reporting condition, the mobile terminal 120 directly proceeds to step 455 where it fails in ESG initialization, ending the ESG initialization.

An alternative embodiment of the present invention reports the measurement results along with the current location information regardless of the comparison result between the measured signal quality and the threshold. For example, even though no threshold or measurement time period is defined in the reporting condition, the mobile terminal 120 can measure signal quality and provide the measurement results to the management server 150, when an application for a broadcast service is activated. In addition, when the application for a broadcast service is activated, even though the ESG download fails, the management server 150 can provide initial signal quality measurement results. According to the alternative embodiment of the present invention, it is possible to search for not only the low-signal power areas but also all other areas, and/or to detect signal quality for a plurality of mobile terminals.

Figure 5:
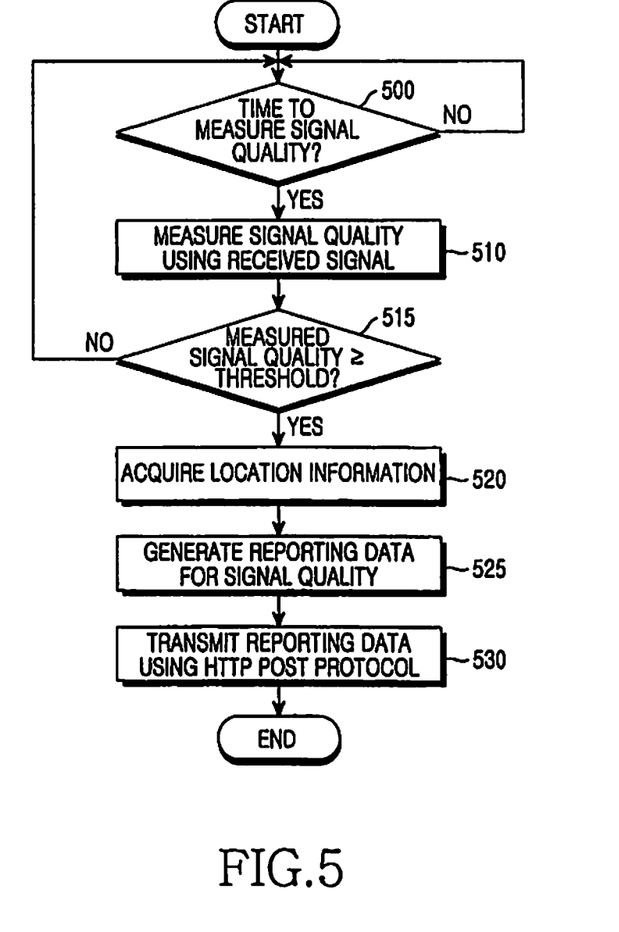
FIG. 5 is a flow diagram illustrating a process of measuring signal quality and generating reporting data depending on the measurement by a mobile broadcasting terminal according to an embodiment of the present invention.

With reference to FIG. 5, a description is provided of a process of measuring signal quality and generating reporting data depending on the measurement. Referring to FIG. 5, the mobile terminal 120 determines in step 500 whether it is time to measure signal quality. The mobile terminal 120 determines if a scheduled measurement time has arrived based on the time period, included in a reporting condition, for which it measures signal quality. If it is time to measure signal quality, the mobile terminal 120 measures signal quality using the received signal in step 510.

For example, in order to measure strength of a signal received through a frequency for a broadcast service that the user selected, the mobile terminal 120 checks a SNR value of the received signal. Thereafter, the mobile terminal 120 determines in step 515 whether the measured signal quality is less than or equal to a threshold. If it is determined that the measured signal quality is greater than the threshold, the mobile terminal 120 returns to step 500 to determine if it is time measure signal quality. If it is determined that the measured signal quality is less than or equal to the threshold, the mobile terminal 120 acquires its current location information in step 520. The location information can be acquired by means of various methods such as GPS. The reason for transmitting the location information along with the measurement results is to inform the management server 150 of the areas with the reduced signal quality. After acquiring its location information, the mobile terminal 120 generates a reporting message for signal quality in step 525.

Figure 6:
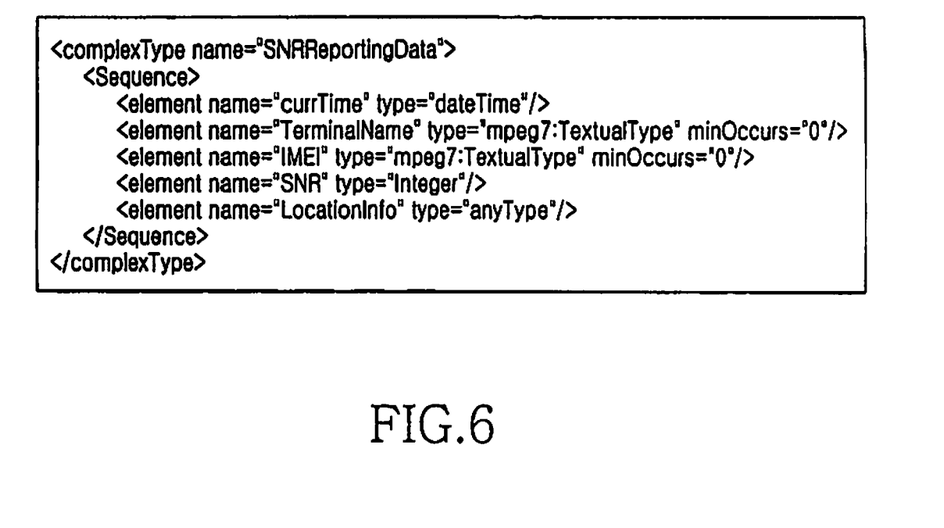
FIG. 6 is a diagram illustrating a structure of a signal quality reporting message according to an embodiment of the present invention.

The signal quality measurement results and the current location information are included in the reporting message. In addition, area information corresponding to the current location information, a measurement time, and identification information for the mobile terminal can be included in the reporting message. An exemplary structure of the reporting message is shown in FIG. 6. FIG. 6 illustrates a signal quality reporting message, in which "currTime" indicates a transmission time of the reporting message, "TerminalName" indicates a model number of the mobile terminal, and "IMEI", an abbreviation for "International Mobile Equipment Identity", indicates a unique number of the mobile terminal. In addition, "SNR" indicates the signal quality measurement results, and "LocationInfo" indicates the current location information of the mobile terminal or area information at the current location.

When the reporting message having the structure shown in FIG. 6 is generated, the mobile terminal 120 transmits the reporting message to the management server 150 using a HTTP POST protocol in step 530. Accordingly, the reporting message is first delivered to the HTTP server 160, and then provided to the location information analysis server 180, so that HTTP server 160 is provided with correct area information from the location information analysis server 180. Then the HTTP server 160 adds the reporting message and it's associated area information together, and stores it in the DB server 170. As a result, data for the areas where signal quality of each mobile terminal is less than or equal to a threshold, is accumulated in the DB server 170.

Figure 7:
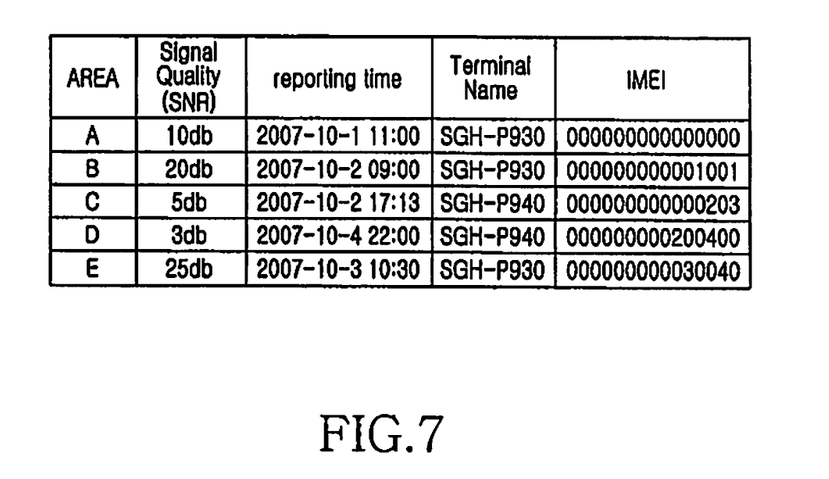
FIG. 7 is a diagram illustrating a structure of a database in which reporting data for signal quality is stored, according to an embodiment of the present invention.

FIG. 7 illustrates a database for collected data, and data is accumulated in the database so that it is possible to comprehend temporal/regional distribution of mobile terminals. Specifically, signal quality data is stored in DB server 170. By accumulating the automatically collected data, the management server 150 can easily determine how many terminals have a signal quality less than or equal to a threshold in certain areas.

As is apparent from the foregoing description, according to the embodiments of the present invention, the mobile broadcasting terminal automatically collects low-signal strength area information, and provides it to the server, so that the mobile broadcasting provider can costly, rapidly and easily analyze the state of the mobile network on an area-by-area basis. In addition, since it is possible to comprehend temporal/regional distribution of mobile terminals using the collected information, the mobile broadcasting provider can efficiently manage the mobile broadcasting service.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A system for measuring signal quality in a mobile broadcasting network, the system comprising:
 a broadcast server for transmitting mobile broadcasting signals, generating a control message including a reporting condition for signal quality, and broadcasting the control message within the mobile broadcasting network;
 at least one mobile broadcasting terminal for providing a mobile broadcasting service using the mobile broadcasting signals received from the broadcast server through the mobile broadcasting network, upon receipt of the control message, measuring signal quality at a current location in accordance with the reporting condition of the received control message, and transmitting a reporting message including the measured signal quality and area information corresponding to the current location through a mobile communication network; and
 a management server for collecting signal quality measurements of each area based on the reporting message transmitted from the at least one mobile broadcasting terminal, and managing the collected signal quality measurements of each area,
 wherein the at least one mobile broadcasting terminal transmits the reporting message when the measured signal quality is less than or equal to a predetermined threshold,
 wherein the broadcast server is included in the mobile broadcasting network, and the management server is included in the mobile communication network, which is different from the mobile broadcasting network.

2. The system of claim 1, wherein the at least one mobile broadcasting terminal measures signal quality at the current location when the reporting condition is in the control message.

3. The system of claim 1, wherein the reporting condition comprises an address of the management server, a time period for measuring signal quality, and a threshold used for determining a level of the measured signal quality.

4. The system of claim 3, wherein the at least one mobile broadcasting terminal measures signal quality at the current location during the time period, and transmits the reporting message when the measured signal quality is less than or equal to the threshold.

5. The system of claim 1, wherein the control message comprises an Electronic Service Guide (ESG) message, and the reporting condition is inserted into a "PrivateAuxiliaryData" element defined in an ESG Provider Descriptor of the ESG message.

6. The system of claim 1, wherein the reporting message comprises a transmission time of the reporting message, a model number of a corresponding mobile broadcasting terminal, a unique number of the corresponding mobile broadcasting terminal, the measured signal quality, and area information corresponding to the current location.

7. The system of claim 1, wherein the at least one mobile broadcasting terminal transmits the reporting message to the management server via a mobile communication network that uses a Hypertext Transfer Protocol (HTTP) POST protocol.

8. A method for measuring signal quality in a mobile broadcasting terminal of a mobile broadcasting system, the method comprising the steps of:
 receiving a control message broadcasted from a broadcast server through a mobile broadcasting network;
 measuring signal quality at a current location in accordance with a reporting condition of the received control message;
 generating a reporting message using the measured signal quality and area information corresponding to the current location; and transmitting the generated reporting message to a management server through a mobile communication network,
wherein the reporting message is generated when the measured signal quality is less than or equal to a predetermined threshold,
wherein the broadcast server is included in the mobile broadcasting network, and the management server is included in the mobile communication network, which is different from the mobile broadcasting network.

9. The method of claim 8, wherein the signal quality is measured when a reporting condition is in the control message.

10. The method of claim 8, wherein the reporting condition comprises an address of a management server from which the transmitted reporting message is received, a time period for measuring signal quality, and a threshold used for determining a level of the measured signal quality.

11. The method of claim 10, wherein generating a reporting message comprises:
   measuring signal quality at the current location during the time period; and
   generating the reporting message when the measured signal quality is less than or equal to the threshold.

12. The method of claim 8, wherein the control message comprises an Electronic Service Guide (ESG) message, and the reporting condition is inserted into a "PrivateAuxiliaryData" element defined in an ESG Provider Descriptor of the ESG message.

13. The method of claim 8, wherein the reporting message comprises a transmission time of the reporting message, a model number of a corresponding mobile broadcasting terminal, a unique number of the corresponding mobile broadcasting terminal, the measured signal quality, and area information corresponding to the current location.

14. The method of claim 8, wherein the generated reporting message is transmitted to a management server via a mobile communication network that uses a Hypertext Transfer Protocol (HTTP) POST protocol.

15. An apparatus for measuring signal quality in a mobile broadcasting terminal of a mobile broadcasting system, the apparatus comprising:
   a receiver for receiving a control message broadcasted from a broadcast server through a mobile broadcasting network;
   a reporting manager for measuring signal quality at a current location in accordance with a reporting condition of the received control message, and generating a reporting message using the measured signal quality and current location information; and
   a transmitter for transmitting the generated reporting message to a management server through a mobile communication network,
wherein the reporting manager generates the reporting message when the measured signal quality is less than or equal to a predetermined threshold,
wherein the broadcast server is included in the mobile broadcasting network, and the management server is included in the mobile communication network, which is different from the mobile broadcasting network.

16. The apparatus of claim 15, wherein the reporting manager measures signal quality at the current location when the reporting condition is included in the control message.

17. The apparatus of claim 15, wherein the reporting condition comprises an address of a management server from which the transmitted reporting message is received, a time period for measuring signal quality, and a threshold used for determining a level of the measured signal quality.

18. The apparatus of claim 17, wherein the reporting manager measures signal quality at the current location during the measurement time period, and generates the reporting message when the measured signal quality is less than or equal to the threshold.

19. The apparatus of claim 15, wherein the control message comprises an Electronic Service Guide (ESG) message, and the reporting condition is inserted into a "PrivateAuxiliaryData" element defined in an ESG Provider Descriptor of the ESG message.

20. The apparatus of claim 15, wherein the reporting message comprises a transmission time of the reporting message, a model number of a corresponding mobile broadcasting terminal, a unique number of the corresponding mobile broadcasting terminal, the measured signal quality, and area information corresponding to the current location.

21. The apparatus of claim 15, wherein the reporting manager comprises:
   an analyzer for analyzing the reporting condition included in the received control message;
   a location information extractor for providing current location information of the mobile broadcasting terminal;
   a signal quality measurer for measuring quality of a signal received from the receiver; and
   a reporting message generator for generating the reporting message using the measured signal quality and the current location information in accordance with the analyzed reporting condition.

22. The apparatus of claim 21, wherein the transmitter transmits the reporting message to a management server via a mobile communication network that uses a Hypertext Transfer Protocol (HTTP) POST protocol.

* * * * *